United States Patent [19]

Rivero-Olmedo

[11] Patent Number: 4,872,338

[45] Date of Patent: Oct. 10, 1989

[54] EXPANSION MECHANISM FOR METER BOX OR METER YOKE

[76] Inventor: José M. Rivero-Olmedo, Santurce, P.R.

[21] Appl. No.: 251,987

[22] Filed: Sep. 29, 1988

Related U.S. Application Data

[63] Continuation of Ser. No. 170,644, Mar. 16, 1988, abandoned, which is a continuation of Ser. No. 816,903, Jan. 8, 1986, abandoned.

[51] Int. Cl.$^4$ ............................................. G01F 15/18
[52] U.S. Cl. ....................................... 73/201; 73/273; 285/32
[58] Field of Search ...................... 73/201, 272 R, 273; 283/31, 32, 325, 327

[56] References Cited

U.S. PATENT DOCUMENTS

| | | | |
|---|---|---|---|
| 1,473,751 | 11/1923 | Walker | 73/201 |
| 1,495,011 | 5/1924 | Ford | 73/201 |
| 1,847,606 | 3/1932 | Ford | 285/32 X |
| 2,125,380 | 8/1938 | Krueger | 285/32 X |
| 3,583,731 | 6/1971 | Jewell | 285/325 X |
| 3,913,400 | 10/1975 | Floren | 73/273 |

*Primary Examiner*—Herbert Goldstein
*Attorney, Agent, or Firm*—Lalos & Keegan

[57] ABSTRACT

An expansion mechanism for a meter box or a meter yoke. The mechanism includes a body having an at least partially threaded axial body opening passing therethrough. The body has four spaced spokes extending generally radially out therefrom in the form of a cross. The body has first and second diametrically opposed positioning prongs and a third positioning prong disposed generally midway between them. The three prongs each have inwardly-disposed lips at their outer ends. A bushing having a nut with a threaded female portion into which the meter threads and having a threaded male portion adapted to thread into the threaded body opening is provided. The bushing includes a sleeve adapted to pass through and partially out of the body opening when the threaded male portion is threaded into the threaded body opening. A cup having a cup opening passing therethrough and an outwardly flaring annular cup lip at one end thereof is also provided. The cup is positionable so that the cup opening is aligned with the body opening by inserting the cup lip between the first and second prongs and towards the third prong and being held at least partially in position by the lips of the three prongs. The sleeve passes at least partially into the cup opening after the cup has been positioned between the prongs and the bushing threaded towards the body. A rubber gasket is positioned inside of the prongs and between the cup lip and the body. The body, bushing and cup are each formed of a resilient plastic material.

16 Claims, 2 Drawing Sheets

EXPANSION MECHANISM FOR METER BOX OR METER YOKE

This is a continuation of co-pending application Ser. No. 170,644 filed on Mar. 16, 1988, now abandoned, which application is a continuation of application Ser. No. 816,903 filed on Jan. 8, 1986, now abandoned.

BACKGROUND OF THE INVENTION

This invention relates to meter boxes and meter yokes. It more particularly relates to expansion mechanisms for mounting fluid meters in meter boxes and meter yokes.

In the past, the expansion mechanisms for liquid meters were manufactured of brass or bronze and included a cast brass or bronze body machined thereafter. These brass expansion mechanisms were mass produced at a very low cost. As a result, they were often considered expendible and the fact that they were wanting in any one of several respects was discounted due to their low cost. In situations where it was anticipated that these expansion mechanisms would fail for one reason or another, the general attitude of the art was to use them and plan to replace them when they failed.

One major shortcoming of these conventional expansion mechanism constructions was the fact that the metal was subject to being attacked or reduced by electrolytic action with resulting failure. While there are many situations where it is known that electrolytic action will or may be encountered and troublesome and oftentimes expensive efforts or steps can be made to overcome such actions, there are many other situations where it is not expected. Further, the magnitude of such action and the part or parts of the expansion mechanism construction that will be attacked by it are seldom determinable. Thus, the effective life of the expansion mechanism and meter can seldom, if ever, be determined.

Another major shortcoming of the brass expansion mechanism is that the cast portion thereof is frequently replete with holes and cavities as a result of impurities and the like in the metal. Such defects in the casting are seldom visible and frequently and unexpectedly result in ruptures, leaks and the like when the expansion mechanisms are in use.

Another shortcoming is the fact that brass and bronze have a relatively high coefficient of friction with water and certain other fluids. As a result, brass or bronze plug expansion mechanisms create a substantial resistance to fluid flow through them. These expansion mechanisms also have a number of separate parts in which cracks and crevices are defined and in which foreign matters can lodge.

Also, the arrangement used to hold the cup of the expansion mechanism to the main body was not sufficient to avoid the loss of the cup and also at the same time to prevent leaks between the main body and the cup.

Further, the main body of conventional mechanisms has a hand wheel in a star shape which makes it difficult to turn inside of a meter box in which there is limited space available between the walls of the box and the diameter of the hand wheel. Thus, frequently the person who installs the meter does not have enough clearance to turn the wheel suficiently, and a seal is not thereby effected at the end of the fitting and leaking occurs.

OBJECTS OF THE INVENTION

Accordingly, it is the principal object of the present invention to provide an improved expansion mechanism for meter boxes and meter yokes.

Another object of the present invention is to provide a novel expansion mechanism which is installed without the use of wrenches or tools.

A further object of the present invention is to provide an improved expansion mechanism which is turned easily by hand without the risk of cutting the installer's fingers.

A still further object of the present invention is to provide an improved expansion mechanism which is easy to install.

Another object is to provide an improved expansion mechanism which prevents leaks between the main body and the expansion mechanism cup.

A further object is to provide an improved expansion mechanism which eliminates leaking between the meter and the adjacent connecting fittings.

A still further object is to provide an improved expansion mechanism which is less likely to be attacked or reduced by electrolytic action.

Another object is to provide an improved expansion mechanism which is less likely to rupture or leak.

A further object is to provide an improved expansion mechanism which reduces the resistance to flow through it so greater flow can pass through the mechanism.

A still further object is to provide a novel expansion mechanism which is lightweight and has a minimum number of parts.

Other objects and advantages of the present invention will become more apparent to those persons having ordinary skill in the art to which the present invention pertains from the foregoing description taken in conjunction with the accompanying drawings.

DETAILED DESCRIPTION OF THE PREFERRED EMBODIMENT

Figure 1:
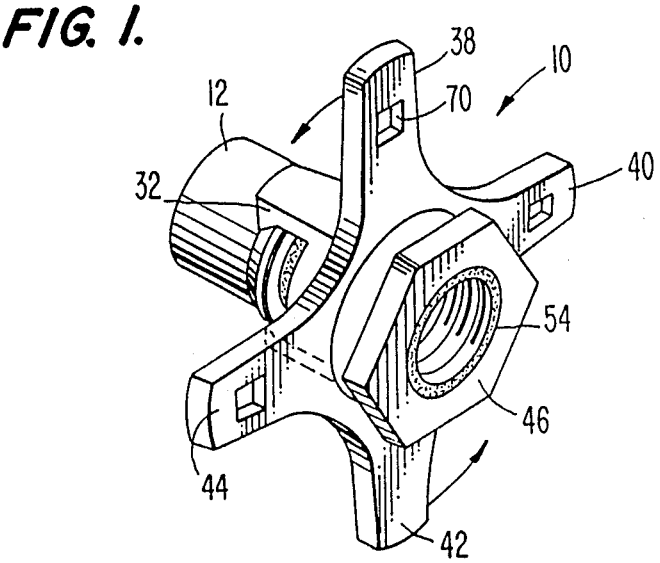
FIG. 1 is a perspective view of an expansion mechanism of the present invention.
Figure 2:
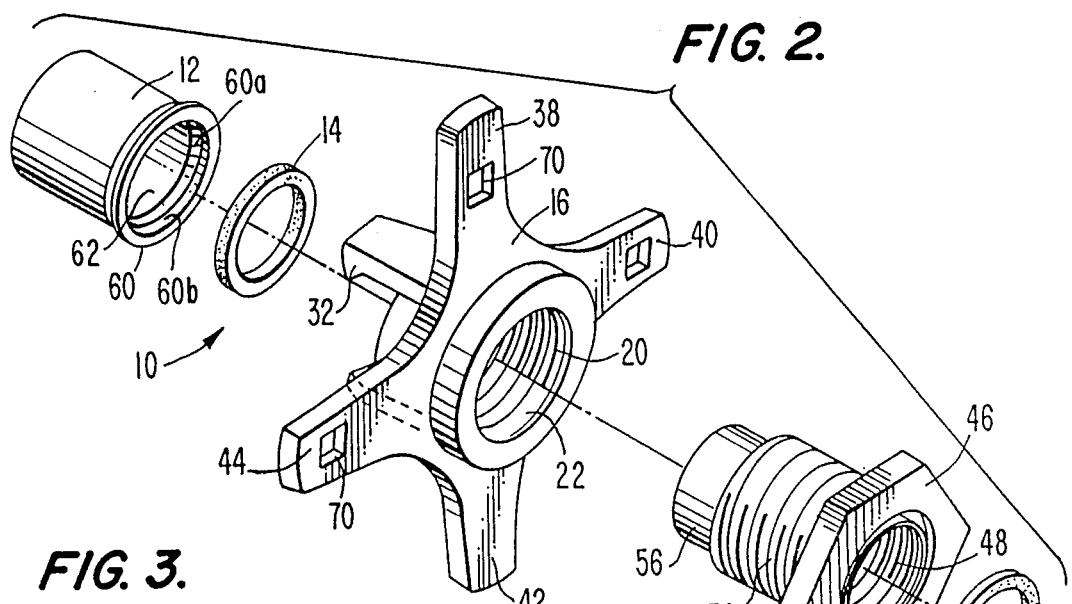
FIG. 2 is a perspective view of the expansion mechanism of FIG. 1 with the parts thereof illustrated in exploded relation.
Figure 4:
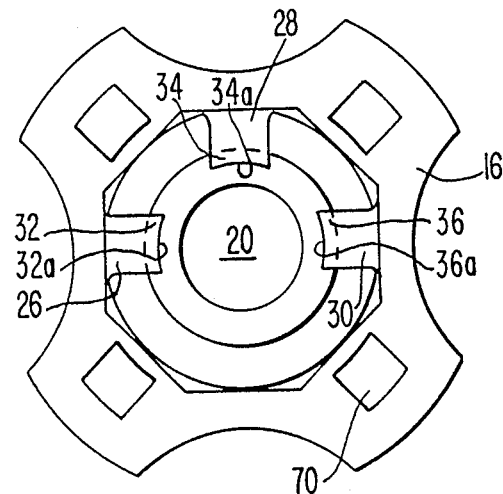
FIG. 4 is an end view of the body of the expansion mechanism of FIG. 1.
Figure 5:
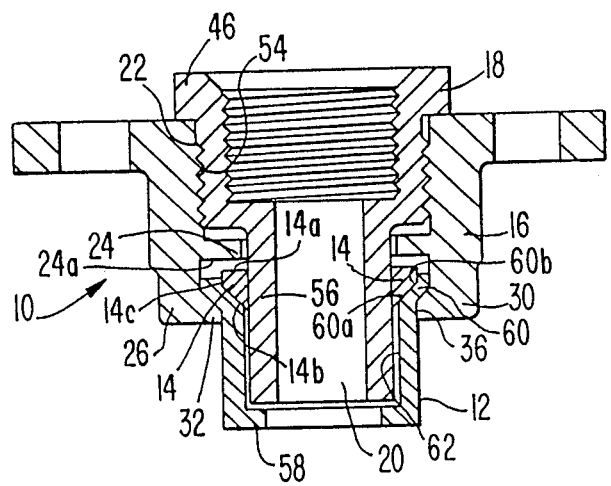
FIG. 5 is a longitudinal cross-sectional view of the expansion mechanism of FIG. 1.

An expansion mechanism of the present invention is illustrated in the drawings generally at 10. It is shown to comprise four basic parts: a cup 12, a rubber gasket 14, a body 16 or hand wheel, and a bushing 18. These parts are shown in exploded relation for clarity's sake in FIG. 2 and in a cut away assembled view in FIG. 5. Body 16 has a body opening 20 passing axially through it. Opening 20 has threads 22 generally its entire length, as illustrated in FIG. 5, and an annular rim 24 at one end. Three spaced positioning prongs 26, 28 and 30 project axially, as shown in FIG. 4, and each has an inwardly projecting lips 32, 34, and 36, respectively, at its outer end. The lips hold cup 12 to body 16 as will be explained later.

Body 16 further has four elongated spokes 38, 40, 42, 44 projecting axially from it. The user can easily and effectively turn body 16 to seal expansion mechanism 10 to the adjacent structure by inserting his fingers between the spokes and onto the sides of the spokes or between them and then turning them. This spoke design allows the body to be completely turned even in constricted spaces such as in meter boxes and to be safely turned without the risk of cutting the fingers of the installing personnel.

Bushing 18 has a nut 46 at one end and a threaded opening 48 into it. Nut 46 is screwed onto the male threaded member of meter 50. A gasket 52 is positioned adjacent the nut to define a seal. Adjacent nut 46, bushing 18 has an outer threaded portion 54 and a narrower sleeve 56 extends axially from it.

Cup 12 has at one end an inwardly disposed rim 58, at its opposite end an outwardly flaring rim 60, and an opening 62 passing axially therethrough. The flaring rim 60 includes an annular inner surface 60a having an annular lip 60b for receiving gasket 14. Cup 12 is positioned by slipping rim 60 between diametrically opposed prongs 26 and 30 and towards prong 28 until it is positioned axially aligned with body opening 20. Gasket 14 is positioned between rim 60, body 16 and annular rim 24. The gasket 14 is provided with a flat annular side 14a for engaging with a flat side 24a of annular rim 24. Further, the gasket 14 is provided with an annular inclined surface 14b for engaging and sealing against annular inner surface 60a of rim 60, and an annular outer peripheral surface 14c cooperating with annular lip 60b.

Lips 32, 34 and 36 hold cup rim 58 at least partially in position. The lips 32, 34 and 36 include curved surfaces 32a, 34a, and 36a engaging with an outer surface of the cup 12, adjacent the flaring rim 60, as shown in FIG. 5.

After cup 12 is fitted in place relative to the prongs, sleeve 56 is positioned into body opening 20 and threaded portion 54 turned so that it threads into body threads 22. As can be appreciated from FIG. 5, sleeve 56 will then extend into cup opening 62. Rim 58 provides a stop abutment for sleeve 56, and sleeve 56 holds cup 12 radially in place.

Figure 3:
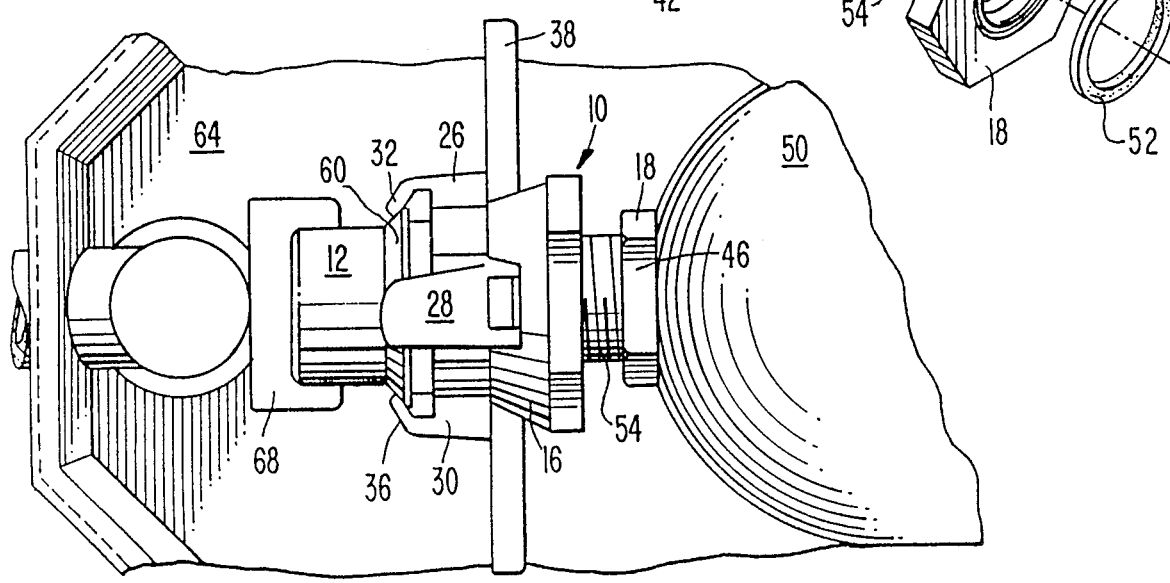
FIG. 3 is a top plan view of the expansion mechanism of FIG. 1 shown installed in a meter box.
Figure 6:
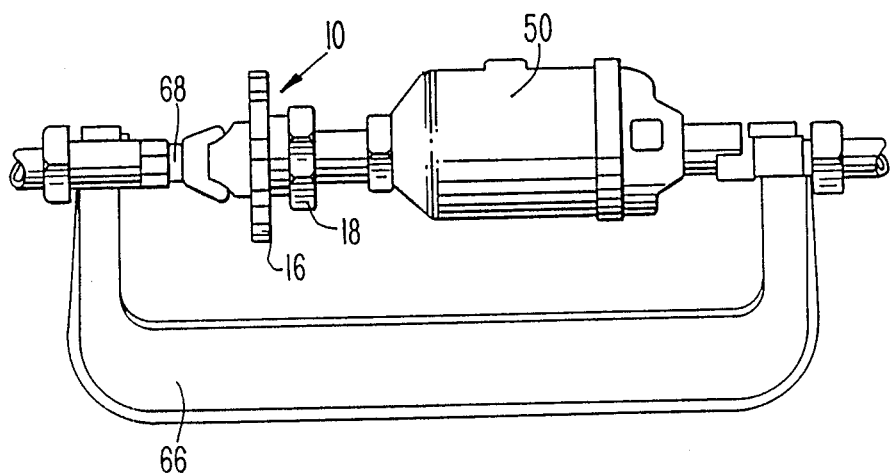
FIG. 6 is a side plan view of the expansion mechanism of FIG. 1 shown installed in a meter yoke.

Expansion mechanism 10 is first screwed via nut 46 to meter 50. The meter and expansion mechanism are then fitted into a meter box 64 as shown in part in FIG. 3 or in a meter yoke 66 as shown in FIG. 6. An example of a meter box construction is shown in U.S. Pat. No. 3,212,339. Cup 12 is fitted in connecting fitting 68. By manually turning body 16 via spokes 38, 40, 42 or 44, expansion mechanism 10 is sealed to connecting fitting 68. Body 16 is then secured in position by passing a wire seal through one of the openings 70 in one of the spokes.

Cup 12, body 16 and bushing 18 are each formed of plastic, for example, a resilient plastic material such as acetal copolymer plastic. Plastic has a lower coefficient of friction with fluids, e.g. water, than does brass or bronze. Thus, there will be less resistance to flow with expansion mechanism 10 than conventional mechanisms and a greater flow through it can be obtained. Forming the expansion mechanism of unitary plastic parts provides a sanitary, non-oxidizing and non-contaminating mechanism having a minimum number of separate parts in whose cracks and crevices foreign matter can lodge. Also, since it is formed of a dielectric material, it will not create or be affected by electrolytic action.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An expansion mechanism for connecting a meter within a meter box or yoke, comprising:
   a hand wheel having a partially threaded axial opening therethrough with an annular rim extending inwardly into said axial opening, and positioning prongs at one end of said axial opening, said annular rim having an annular surface with a diameter less than a diameter of said axial opening through said hand wheel;
   a bushing having an outer threaded portion cooperating with said partially threaded axial opening in said hand wheel, a sleeve cooperating with and providing a close fit with said annular surface of said annular rim, and means for operatively connecting said bushing to a conduit;
   a cup comprising a sleeve having a flaring rim at one end and an opening at an opposite end thereof, said cup being retained by said prongs of said hand wheel; and
   an annular gasket positioned about said sleeve of said bushing, and located between said flaring rim and said annular rim, whereby threaded movement between said hand wheel and said bushing may place sealing pressure on said annular gasket.

2. An expansion mechanism according to claim 1, wherein said hand wheel comprises a sleeve having a radially outwardly extending gripping element.

3. An expansion mechanism according to claim 2, wherein said hand gripping element is positioned at an axial distance from said annular rim.

4. An expansion mechanism according to claim 3, wherein said hand gripping element is positioned on said sleeve at approximately the same axial location as threads of said partially threaded opening through said hand wheel.

5. An expansion mechanism according to claim 1, wherein said means for operatively connecting a conduit comprises an at least partially threaded axial opening through said bushing.

6. An expansion mechanism according to claim 5, wherein threads of said at least partially threaded axial opening through said bushing at least partially overlap in the axial direction with said outer threaded portion of said bushing.

7. An expansion mechanism according to claim 1, wherein said annular gasket includes a flat side for cooperating with and sealing against a flat side of said annular rim.

8. An expansion mechanism according to claim 7, wherein said annular gasket includes an annular inclined surface set at an angle approximately equal to that of an annular inner surface of said flaring rim for cooperating with and sealing against said annular inner surface of said flaring rim.

9. An expansion mechanism according to claim 8, wherein said flaring rim includes an annular lip oriented in the axial direction for cooperating with an outer peripheral surface of said annular gasket for receiving said annular gasket within said flaring rim.

10. An expansion mechanism according to claim 1, wherein said prongs include first and second diametrically opposed positioning prongs and a third positioning prong disposed generally midway between first and second prongs, said first, second and third prongs having inwardly disposed lips at their outer ends.

11. An expansion mechanism according to claim 1, wherein said hand wheel, bushing and cup are formed of plastic.

12. An expansion mechanism according to claim 11, wherein said plastic comprises an acetal copolymer.

13. An expansion mechanism according to claim 2, wherein said gripping element includes four circumferentially spaced apart spokes extending generally radially outwardly from said sleeve.

14. An expansion mechanism according to claim 13, wherein at least three of said spokes have openings through which a wire seal can be passed.

15. An expansion mechanism according to claim 1, wherein each said prong includes a curved surface which engages with an outer surface of said cup adjacent said flaring rim.

16. An expansion mechanism according to claim 1, wherein said annular gasket is formed of plastic.

* * * * *